United States Patent
Itoh et al.

(10) Patent No.: US 8,345,453 B2
(45) Date of Patent: Jan. 1, 2013

(54) POWER CONVERSION APPARATUS FOR ELECTRIC VEHICLE

(75) Inventors: Daisuke Itoh, Tokyo (JP); Satoshi Azuma, Tokyo (JP); Kengo Sugahara, Tokyo (JP); Masataka Yabuuchi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 270 days.

(21) Appl. No.: 12/677,181

(22) PCT Filed: Sep. 21, 2007

(86) PCT No.: PCT/JP2007/068411
§ 371 (c)(1),
(2), (4) Date: Mar. 9, 2010

(87) PCT Pub. No.: WO2009/037782
PCT Pub. Date: Mar. 26, 2009

(65) Prior Publication Data
US 2010/0207560 A1 Aug. 19, 2010

(51) Int. Cl.
H02M 5/45 (2006.01)
(52) U.S. Cl. ............... 363/37; 363/39; 363/40
(58) Field of Classification Search ............... 363/39, 363/40, 44, 46, 47, 90, 37
See application file for complete search history.

(56) References Cited

U.S. PATENT DOCUMENTS

| | | | |
|---|---|---|---|
| 3,683,271 A | 8/1972 | Kobayashi | |
| 5,293,947 A | 3/1994 | Stratton | |
| 6,151,228 A | 11/2000 | Miyazaki | |
| 6,377,479 B1* | 4/2002 | Ayano et al. | 363/40 |
| 6,459,213 B1* | 10/2002 | Nilssen | 315/224 |
| 6,927,988 B2* | 8/2005 | Cheng et al. | 363/56.04 |
| 7,468,649 B2* | 12/2008 | Chandrasekaran | 336/212 |
| 2003/0161166 A1 | 8/2003 | Mutoh | |
| 2005/0174820 A1 | 8/2005 | Mutoh | |
| 2007/0103163 A1* | 5/2007 | Hachisuka et al. | 324/500 |

(Continued)

FOREIGN PATENT DOCUMENTS

CN 1414691 A 4/2003

(Continued)

OTHER PUBLICATIONS

Notice of Rejection issued in the corresponding Japanese Patent Application No. 2009-533012 dated Feb. 16, 2010, and a Partial English Translation thereof.

(Continued)

*Primary Examiner* — Nguyen Tran
(74) *Attorney, Agent, or Firm* — Buchanan Ingersoll & Rooney PC

(57) ABSTRACT

The object is to effectively reduce the resonant current flowing inside a converter unit and an inverter unit in a power conversion apparatus for an electric vehicle. The power conversion apparatus includes a converter unit that converts an alternating-current power into a direct-current power, an inverter unit that converts the direct-current power into an intended alternating-current power and supplies the intended alternating-current power to an electric motor that drives an electric vehicle, a housing that accommodates the converter unit and the inverter unit and a part of which is connected to ground, and a magnetic core that is disposed inside the housing and that suppresses the resonant current flowing between the converter unit and the inverter unit.

5 Claims, 4 Drawing Sheets

U.S. PATENT DOCUMENTS

2009/0002110 A1* 1/2009 Ahangar et al. ............... 336/60

FOREIGN PATENT DOCUMENTS

| | | |
|---|---|---|
| EP | 0920116 A2 | 6/1999 |
| GB | 2310553 A | 8/1997 |
| JP | 8-237936 A | 9/1996 |
| JP | 9-009412 A | 1/1997 |
| JP | 11-196565 A | 7/1999 |
| JP | 11-235039 A | 8/1999 |
| JP | 11-355909 | 12/1999 |
| JP | 2000-166254 A | 6/2000 |
| JP | 2001-086734 A | 3/2001 |
| JP | 2004-166358 | 6/2004 |
| JP | 2004-187368 A | 7/2004 |
| JP | 2005-117862 A | 4/2005 |
| JP | 2005-160263 A | 6/2005 |
| JP | 2005-204438 A | 7/2005 |
| JP | 2005-303280 | 10/2005 |
| JP | 2006-025467 A | 1/2006 |
| JP | 2006-136058 A | 5/2006 |
| RU | 2 100 221 | 12/1997 |

OTHER PUBLICATIONS

Office Action from Korean Patent Office issued in corresponding Korean Patent Application No. 10-2010-7005377 dated Jun. 17, 2011.

Extended European Search Report in corresponding European Application No. 07828307.4, dated Feb. 2, 2011.

International Search Report (PCT/ISA/210) for PCT/JP2007/068411 mailed Dec. 11, 2007.

Written Opinion (PCT/ISA/237) for PCT/JP2007/068411 mailed Dec. 11, 2007.

Official Notice of Allowance dated Oct. 27, 2010, issued in the corresponding Russian Patent Application No. 2010110352/07.

Office Action form the State Intellectual Property Office, P.R. China dated May 24, 2012, issued in corresponding Chinese Patent Application No. 200780100752.3, with English translation thereof.

* cited by examiner

POWER CONVERSION APPARATUS FOR ELECTRIC VEHICLE

TECHNICAL FIELD

The present invention relates to a power conversion apparatus for an electric vehicle.

BACKGROUND ART

Patent Literature 1 is an exemplary conventional literature that addresses the issue of noise or the like in a power conversion apparatus for an electric vehicle. According to Patent Literature 1, to suppress a leakage harmonic current flowing in a vehicle body via all pathways formed of a converter, an inverter, and a ground circuit, a filter circuit is either disposed at each of the input side of the converter, the output side of the inverter, and the ground circuit or disposed at either one of the input side of the converter and the output side of the inverter, and at the ground circuit.

Patent Literature 1: Japanese Patent Application Laid-open No. H9-9412

DISCLOSURE OF INVENTION

Problem to be Solved by the Invention

In a power conversion apparatus for an electric vehicle, a converter, an inverter, and the like that constitute the power conversion apparatus need to be installed under the floor of a vehicle body in a suspended manner. For this reason, in a conventional power conversion apparatus for electric vehicle, a box shaped housing (hereinafter referred to as "housing") is prepared to fix to the vehicle body, and is used to accommodate main circuits of the converter and the inverter, connection conductors (bus bars) that connect the converter and the inverter, and smoothing capacitors that are connected between the connection conductors. In addition, a cooler is installed outside of the housing for cooling down heat generated from switching elements of the converter and the inverter.

In the case of an alternating-current electric vehicle, since the secondary side of a transformer is decoupled from the ground, it is necessary to fix the voltage to ground acting on each device to a constant value and connect some point of the circuit at the secondary side to ground. In that regard, in a power conversion apparatus for electric vehicle configured in the abovementioned manner, it is common practice to connect the housing to ground.

Because of the abovementioned configuration in a conventional power conversion apparatus for electric vehicle, the cooler that is placed close to the switching elements and electrically-connected to the housing happens to be the grounding point. The property of such a power conversion apparatus is that there is an increase in stray capacitance between the direct-current bus bars of the converter and the inverter, and the housing or the cooler.

Conventionally, the problem of such stray capacitance has not been unaddressed as a major issue. For example, upon reviewing various conventional literatures including the abovementioned Patent Literature 1, there is no discussion on the problems attributed to the stray capacitance of this kind.

Meanwhile, it was found by the inventors of the present invention that a resonant circuit is formed by the inductance component of a transformer or an electric motor that is connected to a power conversion apparatus for electric vehicle and by the stray capacitance, and that the resonant current flowing in the resonant circuit may act as the noise source that outputs unnecessary noise to the power supply side or the electric motor side.

Thus, as discussed above by the inventors of the present invention, if the converter and the inverter act as noise sources, then, depending on the magnitude of the noise, there is a possibility that the noise current flowing through an overhead contact line has an adverse effect on ground signal equipments, and noise current flowing through a motor wiring has an adverse effect on vehicle signal equipments or ground signal equipments. In addition, in light of the recent technological trend in which an increase in the motor output is considered inevitable, it is desirable to take some measures against the resonance phenomenon attributed to the stray capacitance of this kind.

The present invention has been made to solve the above problems in the conventional technology and it is an object of the present invention to provide a technology that, with respect to a power conversion apparatus for electric vehicle in which a converter and an inverter are accommodated in a housing, enables effective reduction of the resonant current attributed to the stray capacitance between the direct-current bus bars of the converter and the inverter, and the housing.

Means for Solving Problem

In order to solve the abovementioned problem and achieve the object, power conversion apparatus for an electric vehicle according to the present invention includes a converter unit that converts an alternating-current power into a direct-current power; an inverter unit that converts the direct-current power into an intended alternating-current power and supplies the intended alternating-current power to an electric motor that drives an electric vehicle; a housing that accommodates the converter unit and the inverter unit and a part of which is connected to ground; and an impedance element that is disposed inside the housing and that has an inductance component for suppressing a resonant current flowing between the converter unit and the inverter unit.

Effect of the Invention

According to a power conversion apparatus for an electric vehicle of the present invention, inside a housing that accommodates a converter unit and an inverter unit and that is partially connected to ground is disposed a magnetic core that suppresses the resonant current flowing between the converter unit and the inverter unit. Because of that, it becomes possible to effectively reduce the resonant current that is attributed to the stray capacitance between direct-current bus bars of the converter and the inverter, and the housing.

Figure 1:
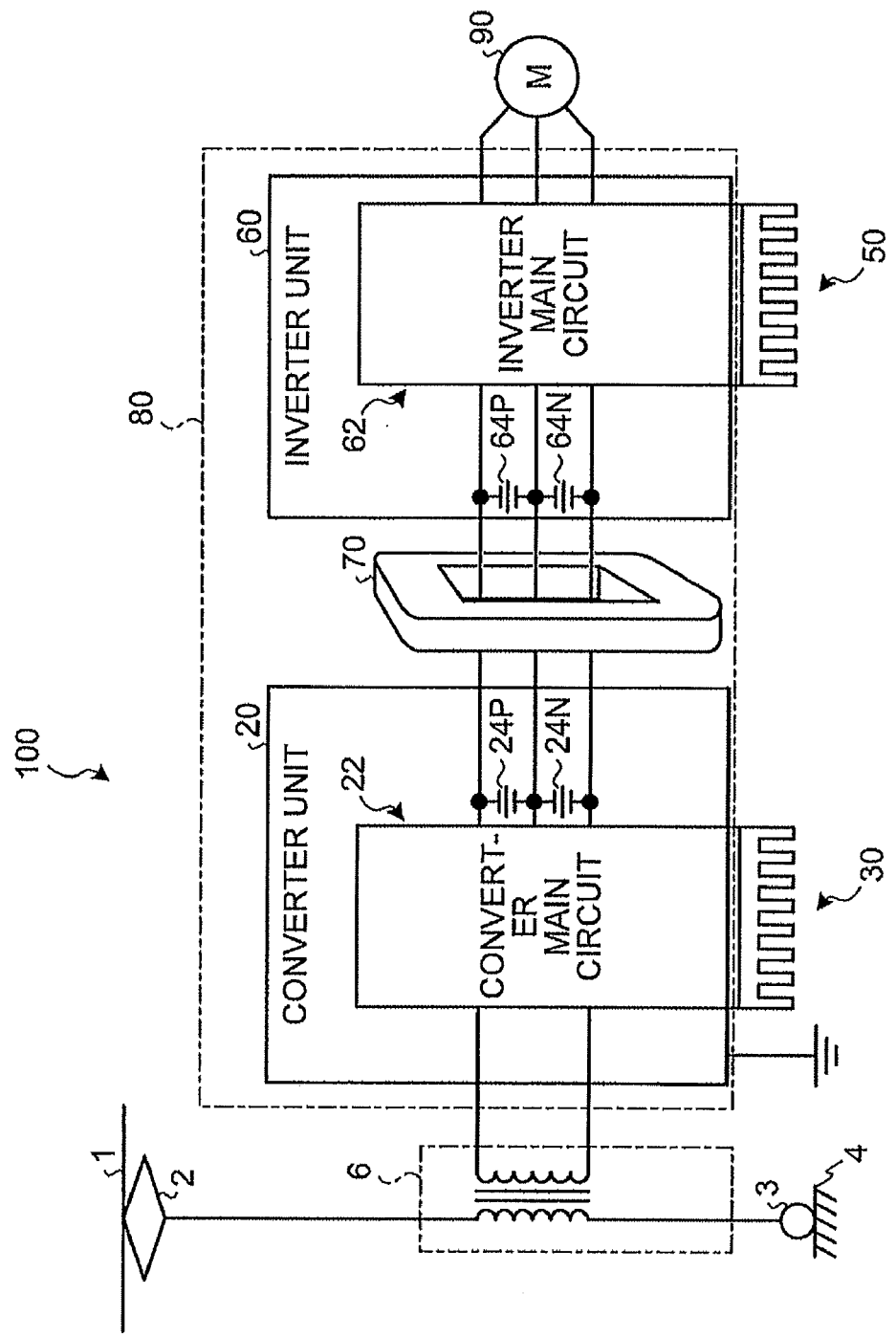
FIG. 1 is a simplified circuit diagram of an exemplary configuration of a power conversion apparatus for an electric vehicle according to a preferred embodiment of the present invention.

EXPLANATIONS OF LETTERS OR NUMERALS 1 overhead contact line
2 current collecting device
3 wheel
4 rail
6 transformer
9 vehicle body
11 electric equipment
20 converter unit
22 converter main circuit
24P, 24N, 64P, 64N smoothing capacitor
30 converter cooler
32 fin base (converter unit)
34 fin (converter unit)
50 inverter cooler
52 fin base (inverter unit)
54 fin (inverter unit)
60 inverter unit
62 inverter main circuit
70, 70a to 70d magnetic core
80 housing
82-84, 86-88 stray capacitance
90 electric motor
91 to 93 resonant current
100 power conversion apparatus
P, C, N connection conductor
W running wind

BEST MODE(S) FOR CARRYING OUT THE INVENTION

A preferred embodiment for a power conversion apparatus for electric vehicle according to the present invention will be described below in detail with reference to the accompanying drawings. The present invention is not limited to the embodiment described below.

FIG. 1 is a simplified circuit diagram of an exemplary configuration of a power conversion apparatus for an electric vehicle according to a preferred embodiment of the present invention. In FIG. 1, a power conversion apparatus 100 includes a converter unit 20, an inverter unit 60, and a magnetic core 70 that is inserted between the converter unit 20 and the inverter unit 60. Each of those constituent elements is attached to a housing 80. To the input terminal of the power conversion apparatus 100 is connected a transformer 6. To the inverter unit 60, which is placed at the output terminal of the power conversion apparatus 100, is connected an electric motor 90 that drives the electric vehicle. As the electric motor 90, it is suitable to use an induction motor or a synchronous motor.

Moreover, in FIG. 1, one end of the primary winding of the transformer 6 is connected to an overhead contact line 1 via a current collecting device 2, while the other end thereof is connected to a rail 4, which is at the ground potential, via a wheel 3. The electric power (generally, alternating current of 20 KV to 25 KV) supplied from the overhead contact line 1 is input to the primary winding of the transformer 6 via the current collecting device 2, while the alternating-current power generated in the secondary winding of the transformer 6 is input to the converter unit 20.

The converter unit 20 includes a converter main circuit 22 to which switching elements are bridge-connected and a converter cooler 30 for cooling down the bridge-connected switching elements. From the three output terminals of the converter main circuit 22 are drawn connection conductors P, C, and N that are connected to the inverter unit 60 described later. The converter main circuit 22 performs PWM control on each bridge-connected switching element to convert the alternating-current voltage supplied from the overhead contact line 1 into an intended direct-current voltage and outputs the direct-current voltage. As the switching elements constituting the converter main circuit 22, it is suitable to use, for example, IGBT elements embedded with anti-parallel diodes. Meanwhile, there are a number of known examples of the detailed configuration and the control method of the converter main circuit 22, the description of which is omitted herein. In the example illustrated in FIG. 1, the converter main circuit 22 is illustrated as a three-level converter. Alternatively, the converter main circuit 22 can also be configured from, for example, a two-level converter (known) and such a configuration also falls within the scope of the present invention.

At the output terminals of the converter main circuit 22 are disposed smoothing capacitors 24P and 24N that act as direct-current power sources for the inverter unit 60. More particularly, the smoothing capacitor 24P is connected between the connection conductors P and C, while the smoothing capacitor 24N is connected between the connection conductors C and N.

The inverter unit 60 includes an inverter main circuit 62 to which switching elements are bridge-connected and an inverter cooler 50 for cooling down the bridge-connected switching elements. To the three input terminals of the inverter main circuit 62 are connected the connection conductors P, C, and N as described above. Smoothing capacitors 64P and 64N, which act as direct-current power sources, are respectively connected between the connection conductors P and C and between the connection conductors C and N. To the output terminals of the inverter main circuit 62 is connected the electric motor 90. The inverter main circuit 62 performs PWM control on each bridge-connected switching element to convert the direct-current voltage input thereto into an intended alternating-current voltage and outputs the alternating-current voltage. As the switching elements constituting the inverter main circuit 62, it is suitable to use, for example, IGBT elements embedded with anti-parallel diodes. Meanwhile, there are a number of known examples of the detailed configuration and the control method of the inverter main circuit 62, the description of which is omitted herein. In the example illustrated in FIG. 1, the inverter main circuit 62 is illustrated as a three-level inverter. Alternatively, the inverter main circuit 62 can also be configured from, for example, a two-level inverter (known) and such a configuration also falls within the scope of the present invention.

Figure 2:
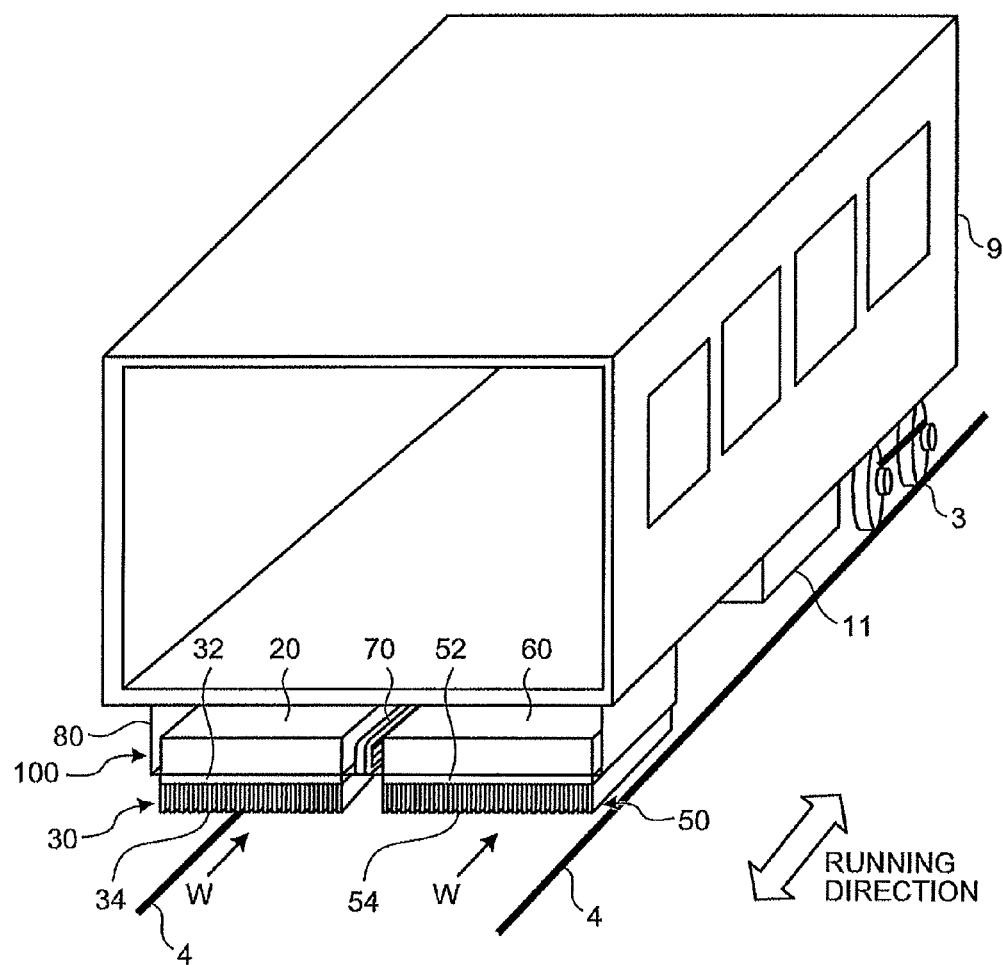
FIG. 2 is a schematic diagram of an exemplary installed state when the power conversion apparatus for electric vehicle illustrated in FIG. 1 is installed with respect to a vehicle body.

FIG. 2 is a schematic diagram of an exemplary installed state when the power conversion apparatus illustrated in FIG. 1 is installed with respect to a vehicle body. As illustrated in FIG. 2, the power conversion apparatus 100 is disposed, along with another electric equipment 11, under the floor of a vehicle body 9. In the power conversion apparatus 100, the converter unit 20, the inverter unit 60, and the magnetic core 70 and the like are accommodated in the housing 80.

The converter cooler 30 includes a fin base 32 and a fin 34, and is disposed at the bottom side of the converter unit 20 in such a way that the fin 34 comes into contact with the outside air. In an identical manner, the inverter cooler 50 includes a fin base 52 and a fin 54, and is disposed at the bottom side of the inverter unit 60 in such a way that the fin 54 comes into contact with the outside air. By disposing the power conversion apparatus 100 in the abovementioned manner, the running wind W that is generated due to the running of the corresponding electric vehicle and that flows in the opposite direction to the running direction flows to the fins 34 and 54, and the heat generated from the switching elements is released into the atmosphere via the fins 34 and 54.

In the abovementioned example, the converter cooler 30 and the inverter cooler 50 are disposed outside the housing 80 in such a way that the fins thereof come into contact with the outside air. However, the arrangement is not limited to that example. For example, it is also possible to dispose each cooler inside the housing 80 to avoid damage to the fins. In such an arrangement, that portion of each cooler disposed inside the housing 80 which comes into contact with the running wind W can be covered with, for example, a mesh-like structure. That enables achieving a natural air cooling system as illustrated in FIG. 2 for the coolers. Meanwhile, in the case of employing a forced air cooling system with an air blower or employing a water cooling system, the converter unit 20 and the inverter unit 60 can be accommodated in the housing 80 without having to use a mesh-like structure or the like.

Figure 3:
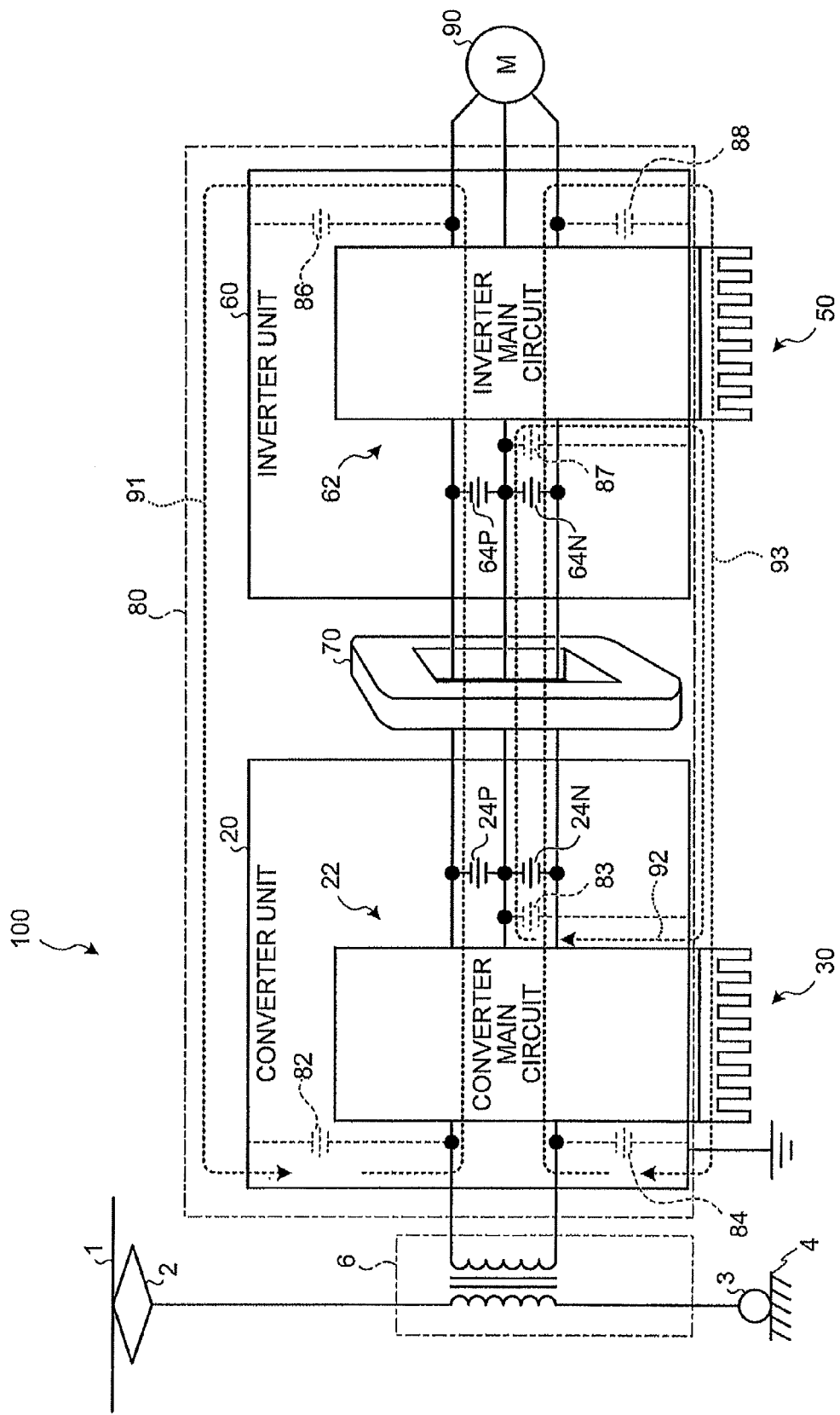
FIG. 3 is a schematic diagram of a pathway of the resonant current that is generated due to the stray capacitance between each connection conductor and the housing of the power conversion apparatus and that is illustrated on a circuit diagram corresponding to FIG. 1.

FIG. 3 is a schematic diagram of a pathway of the resonant current that is generated due to the stray capacitance between each connection conductor and the housing of the power conversion apparatus and that is illustrated on a circuit diagram corresponding to FIG. 1. As described in the section of "PROBLEM TO BE SOLVED BY THE INVENTION", the resonant current is a current that flows to the side of the transformer 6 or the electric motor 90 by the stray capacitance formed between the direct-current bus bars of the converter unit 20 and the inverter unit 60, and the housing 80 and by the inductance component of the transformer 6 or the electric motor 90 connected to the power conversion apparatus 100.

In the converter unit 20 illustrated in FIG. 3, stray capacitances 82 to 84 are formed as illustrated between the direct-current bus bars including the connection conductors P, C, and N, respectively, and the housing 80. In the inverter unit 60, stray capacitances 86 to 88 are formed as illustrated between the direct-current bus bars including the connection conductors P, C, and N, respectively, and the housing 80. Each stray capacitance is illustrated by integrating stray capacitance components that are generated in each part of the converter main circuit 22 and the inverter main circuit 62.

When such stray capacitance components are present, resonance (series resonance) occurs between the inductance components of the transformer 6 and the electric motor 90, and the stray capacitance components. Thus, the impedance for a particular frequency band (e.g., 1 to 2 MHz band) decreases and the current of only that particular frequency band gets amplified. As a result, in the housing 80, a resonant current 91 flows via the stray capacitances 82 and 86, a resonant current 92 flows via the stray capacitances 83 and 87, and a resonant current 93 flows via the stray capacitances 84 and 88.

Therefore, in the present embodiment, the magnetic core 70 having an intended inductance component is so disposed that the connection conductors P, C, and N that connect the converter unit 20 and the inverter unit 60 are passed through the magnetic core 70. By disposing the magnetic core 70, it becomes possible to shift the frequency for the maximum resonant current (hereinafter referred to as "resonant frequency") to a frequency band that does not affect, for example, vehicle signal equipments, ground signal equipments, or the like. Moreover, by inserting the magnetic core 70, it becomes possible to raise the inductance of that frequency band in which resonance is an issue. As a result, the resonant current in that particular frequency band can be reduced and the magnitude of the noise attributed to the resonant current can be reduced to a level that does not cause any problem.

Meanwhile, as the material for the magnetic core 70, it is possible to use, for example, a ferrite material or an amorphous material. Since such a material has the property of low impedance at a low frequency band, there is practically no effect on power transmission in the power supply frequency band.

Moreover, the size of the magnetic core 70 (length of the outer circumference, length of the inner circumference, thickness, aspect ratio or the like) can be suitably determined according to the capacity of the converter unit 20 and the inverter unit 60, or the size and arrangement of each connection conductor, or the like. Furthermore, the inductance value of the magnetic core 70 can be suitably selected depending on the magnitude of the resonant frequency and the stray capacitance.

The abovementioned stray capacitance components are mainly attributed to the facts that the direct-current bus bars including the connection conductors P, C, and N are placed close to the housing 80 and that the housing 80 is connected to ground such that it is at the same electric potential as the ground potential. Therefore, the stray capacitance occurs even if no cooler is disposed. Thus, the abovementioned countermeasures are effective even for a configuration with no cooler. However, in comparison with a configuration with no cooler, a configuration with cooler has larger stray capacitance components due to the effect of the area of a heat releasing fin. Thus, it is desirable to perform suitable selections for each type of configuration.

Figure 4:
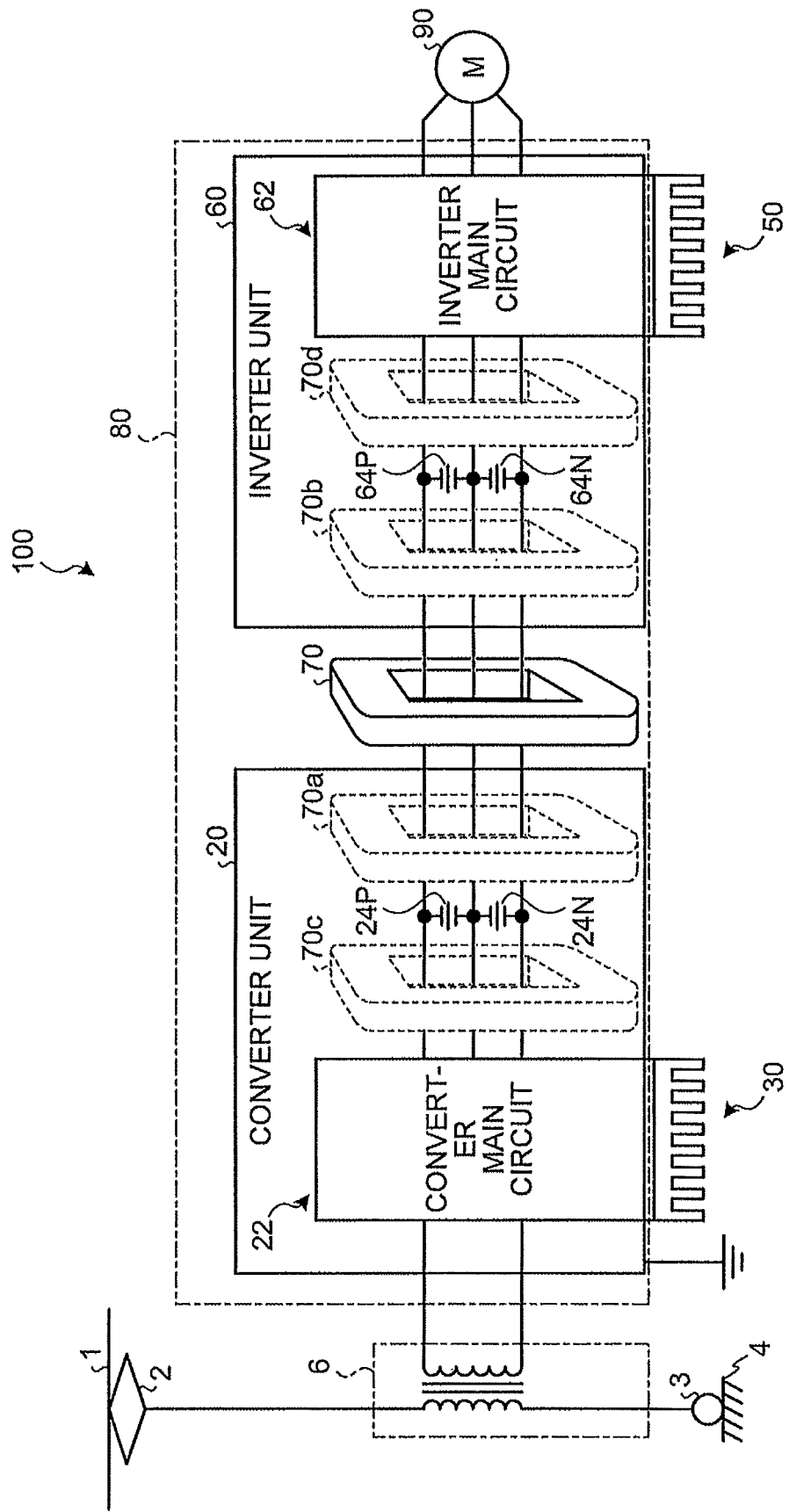
FIG. 4 is a schematic diagram for explaining another embodiment of arrangement of magnetic cores that is different from the arrangement illustrated in FIG. 1.

FIG. 4 is a schematic diagram for explaining another embodiment of magnetic cores that is different from the arrangement illustrated in FIG. 1. In the embodiment illustrated in FIG. 1, the magnetic core 70 is disposed between the converter unit 20 and the inverter unit 60. Alternatively, the magnetic core 70 can also be disposed inside each of the converter unit 20 and the inverter unit 60. For example, inside the converter unit 20, magnetic cores 70a and 70c can be disposed at either of the output side (the side of the connection conductors) or the input side (the side of the converter main circuit) with respect to the smoothing capacitors 24P and 24N as illustrated in FIG. 4. Similarly, inside the inverter unit 60, magnetic cores 70b and 70d can be disposed at either of the input side (the side of the connection conductors) or the output side (the side of the inverter main circuit) with respect to the smoothing capacitors 64P and 64N as illustrated in FIG. 4. Even for such a configuration, the magnetic cores are disposed in the loop pathway through which the resonant current flows. Thus, it is possible to reduce the resonant current attributed to the stray capacitance and shift the resonant frequency to an intended frequency band as the advantages of the present application.

Meanwhile, the magnetic core according to the present embodiment is disposed with the aim of reducing the resonant current that flows due to the resonant circuit formed inside the power conversion apparatus. In addition, since the potential fluctuation due to the resonant current is suppressed, the common-mode current flowing to the side of the transformer or the side of the electric motor is also reduced.

As described above, in the power conversion apparatus for electric vehicle according to the present embodiment, inside a housing that accommodates a converter unit and an inverter unit and that is partially connected to ground is disposed a magnetic core for suppressing the resonant current flowing between the converter unit and the inverter unit. Therefore, it becomes possible to effectively reduce the resonant current attributed to the stray capacitance between the direct-current bus bars of the converter and the inverter, and the housing.

Moreover, in the present embodiment, the magnetic core is disposed as an element for suppressing the resonant current that flows between the converter unit and the inverter unit. Instead of the magnetic core, it is also possible to use a reactor or a common-mode choke coil as an impedance element having an inductance component. Thus, the essential point is that, as long as the resonant frequency can be shifted to a frequency band that does not affect, for example, vehicle signal equipments, ground signal equipments, or the like, it is possible to use an impedance element of any type.

INDUSTRIAL APPLICABILITY

In this way, the present invention is suitable in effectively reducing the resonant current that is generated due to the stray capacitance between direct-current bus bars of a converter and an inverter, and a housing that accommodates the converter and the inverter in a power conversion apparatus for electric vehicle.

The invention claimed is:

1. A power conversion apparatus for an electric vehicle comprising:
   a converter unit that converts an alternating-current power into a direct-current power;
   an inverter unit that converts the direct-current power into an intended alternating-current power and supplies the intended alternating-current power to an electric motor that drives an electric vehicle;
   a housing that accommodates the converter unit and the inverter unit and a part of which is connected to ground; and
   an impedance element that is disposed inside the housing and that has an inductance component that suppresses a resonant current flowing between the converter unit and the inverter unit,
   wherein the impedance element is disposed at least at either one of in the converter unit at an output side of a converter main circuit included in the converter unit and in the inverter unit at an input side of an inverter main circuit included in the inverter unit.

2. The power conversion apparatus for an electric vehicle according to claim 1, wherein the impedance element is disposed between the converter unit and the inverter unit so that a connection conductor that connects the converter unit and the inverter unit is passed through the impedance element.

3. The power conversion apparatus for an electric vehicle according to claim 1, wherein the impedance element is a magnetic core.

4. The power conversion apparatus for an electric vehicle according to claim 2, wherein the impedance element is a magnetic core.

5. A power conversion apparatus for an electric vehicle comprising:
   a converter unit that converts an alternating-current power into a direct-current power, the converter unit including an output terminal;
   an inverter unit that converts the direct-current power into an intended alternating-current power and supplies the intended alternating-current power to an electric motor that drives an electric vehicle, the inverter unit including an input terminal;
   a connection conductor connected to the output terminal of the converter unit and the input terminal of the inverter unit; and
   an impedance element that has an inductance component that suppresses a resonant current flowing between the output terminal of the converter unit and the input terminal of the inverter unit,
   wherein the impedance element is adjacent to the connection conductor and is disposed at least at either one of in the converter unit at the output terminal of the converter unit and in the inverter unit at the input terminal in the inverter unit.

* * * * *